United States Patent [19]

Urano et al.

[11] 4,208,118
[45] Jun. 17, 1980

[54] MOISTURE AND DUST PROOF SEALING ARRANGEMENT FOR CAMERA BODY REAR COVER

[75] Inventors: Fumio Urano, Omiya; Junji Umetsu, Tokyo, both of Japan

[73] Assignee: Asahi Kogaku Kogyo Kabushiki Kaisha, Tokyo, Japan

[21] Appl. No.: 889,081

[22] Filed: Mar. 22, 1978

[30] Foreign Application Priority Data

Mar. 28, 1977 [JP] Japan .................................. 52/37545
Mar. 29, 1977 [JP] Japan .................................. 52/38047

[51] Int. Cl.² .................... G03B 17/02; G03B 17/36
[52] U.S. Cl. ................................. 354/288; 354/217
[58] Field of Search .............. 354/202, 288, 203, 275, 354/217, 64; 312/138

[56] References Cited

U.S. PATENT DOCUMENTS

| | | | |
|---|---|---|---|
| 1,244,978 | 10/1917 | Hales | 354/288 |
| 2,043,926 | 6/1936 | Fuerst | 354/288 |
| 2,749,718 | 6/1956 | Saunders | 312/138 A X |
| 2,771,825 | 11/1956 | Naumann | 354/217 |
| 2,865,271 | 12/1958 | Klein | 354/64 |
| 3,363,528 | 1/1968 | Winkler et al. | 354/217 |
| 3,574,296 | 4/1971 | Prochnow et al. | 354/288 |
| 3,598,463 | 8/1971 | Kesling | 312/138 X |

FOREIGN PATENT DOCUMENTS 680197 10/1952 United Kingdom ..................... 354/288

*Primary Examiner*—Donald A. Griffin
*Attorney, Agent, or Firm*—Sughrue, Rothwell, Mion, Zinn and Macpeak

[57] ABSTRACT

A continuous viscoelastic gasket 2 is compressively sandwiched between mating grooves and surfaces of a camera body 1 and a hinged rear cover 3 to tightly seal the film compartment against moisture and dust when the cover is closed. The interlocking pin 10 of the automatic film counter restoring mechanism is protectively disposed within the gasket perimeter and is engaged by a tab 9b extending inwardly from a reinforcing plate 9 mounted on the rear cover.

5 Claims, 8 Drawing Figures

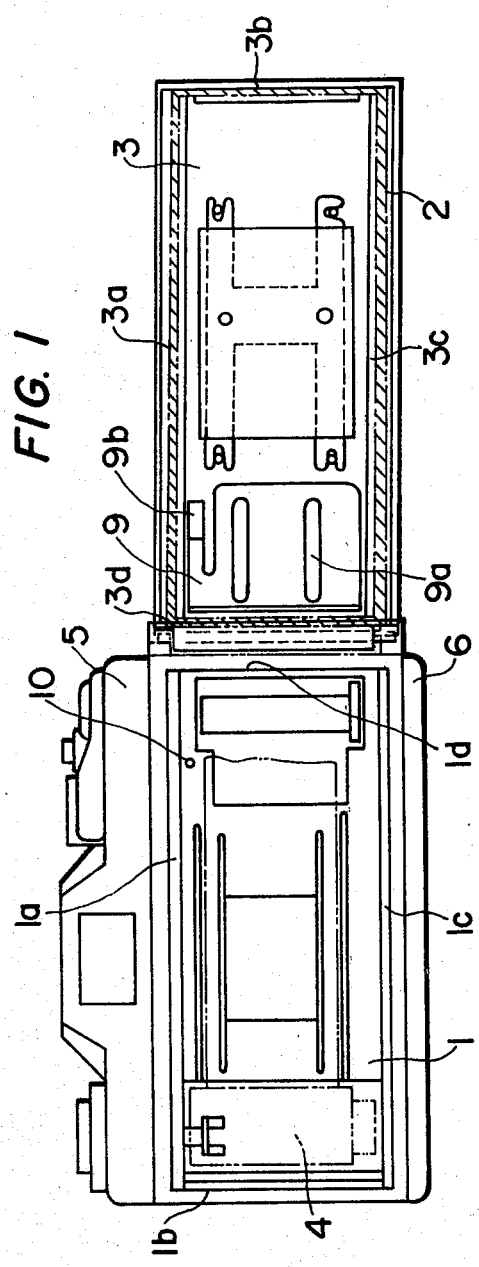
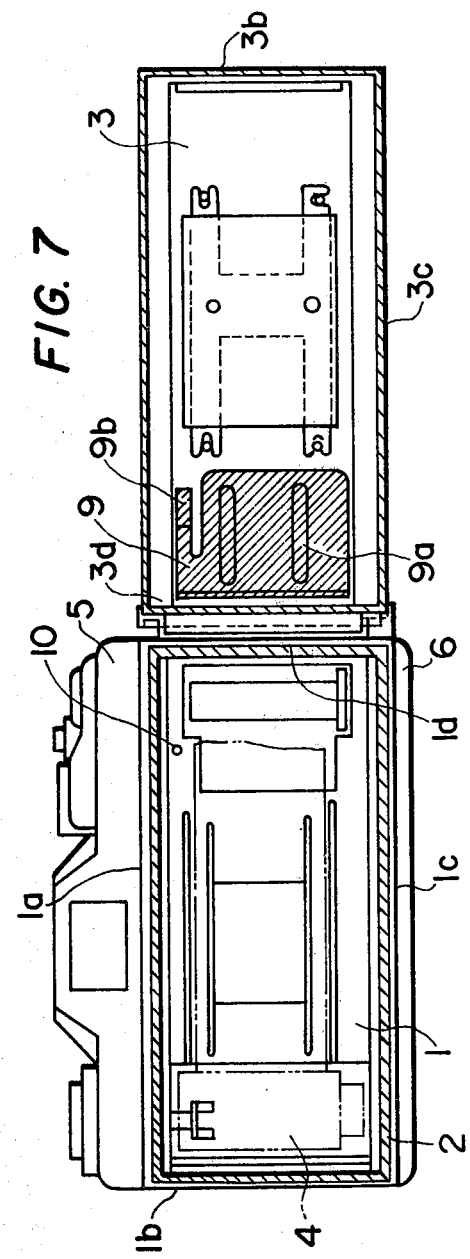

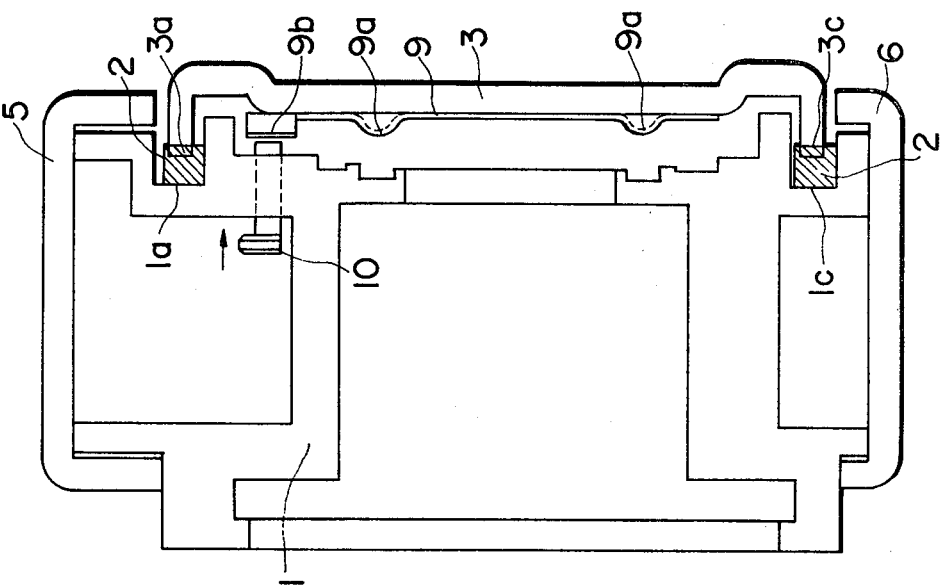
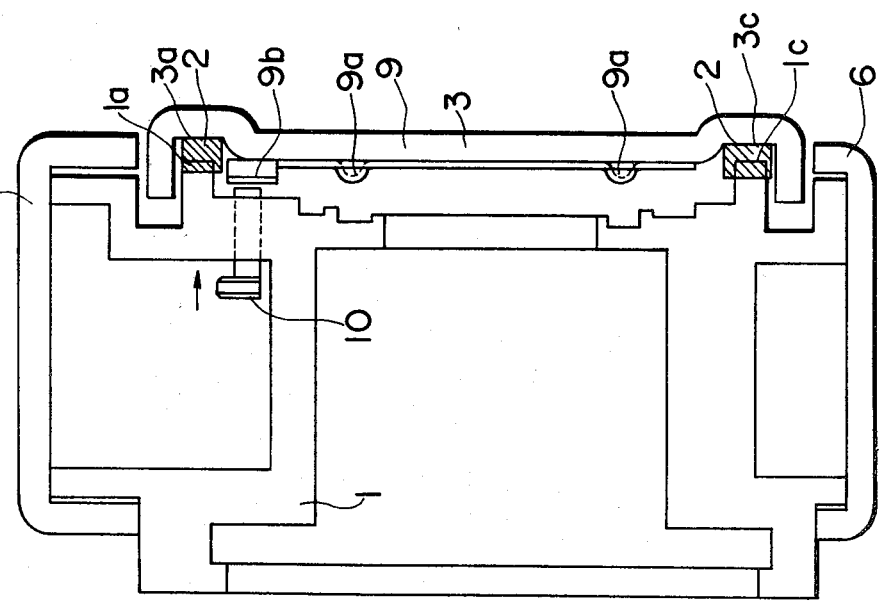

MOISTURE AND DUST PROOF SEALING ARRANGEMENT FOR CAMERA BODY REAR COVER

BACKGROUND OF THE INVENTION

This invention relates to a moisture and dust proof sealing arrangement for the hinged rear cover of a camera.

Under adverse environmental conditions such as rain, dustiness or splashing water, conventional cameras are prone to film damage and camera malfunction due to moisture and dust incursion through the rear film compartment cover, and the use of such cameras is thus greatly limited. One reason for such incursion is that the prior art cover gaskets are typically made of an open sponge material formed of foamed urethane or foamed rubber, and such material has irregular but continuous passages through which dust and moisture may enter.

SUMMARY OF THE INVENTION

Accordingly, an object of this invention is to provide an all-weather camera body and rear cover sealing arrangement which eliminates the above-described drawback of the prior art without lowering the performance and operability of the camera, and which at the same time reduces the operating noise of the camera.

The automatic film counter restoring mechanism of conventional cameras are typically engaged and operated by the collars or edge flanges of the rear covers, whereby they are susceptible to the damaging entry of moisture and dust. According to this invention, however, the interlocking pin of the automatic film counter restoring mechanism is disposed inside the perimeter of a continuous viscoelastic sealing gasket compressively sandwiched between mating grooves and edge flanges on the camera body and rear cover, thereby isolating such mechanism within the sealed area when the rear cover is closed and improving the moisture and dust proofing effects of the gasket. The sealing gasket itself is made of a deformable closed cell viscoelastic material, which is impervious to the passage of moisture and dust.

BRIEF DESCRIPTION OF THE DRAWINGS

In the drawings:

FIG. 1 shows an elevation of the rear side of a camera constructed according to a first embodiment of this invention, with the rear cover open, FIG. 2 shows a sectional end view of the camera, FIG. 7 shows an elevation of the rear side of a camera according to a second embodiment of the invention, and FIG. 8 shows a sectional end view of the camera of FIG. 7.

DETAILED DESCRIPTION OF THE PREFERRED EMBODIMENTS

Figure 3:
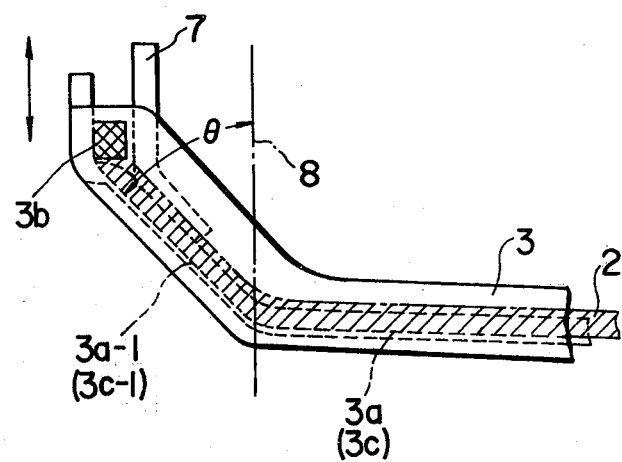
FIG. 3 shows a plan view of the spatula key side of the rear cover.

Referring to FIGS. 1 and 2, in a first embodiment a camera body 1 has an upper eave section 1a, a spatula key section 1b, a lower eave section 1c and a hinge section 1d which form a continuous closed-loop surface surrounding a loading section for a film roll 4. A rear cover 3 has an inside upper belt section 3a, a spatula key section 3b, an inside lower belt section 3c and a hinge section 3d which similarly form a continuous closed-loop surface corresponding to the closed-loop surface of the camera body 1. A continuous viscoelastic sealing gasket 2 is bonded onto the loop surfaces of sections 3a, 3b, 3c and 3d of the rear cover. The gasket 2 is sandwiched by the closed-loop surfaces of the camera body and the rear cover to prevent the entry of moisture or dust into the camera through the gap between the camera body and the rear cover.

The closed-loop surfaces of the camera body and the rear cover are integral therewith and made of the same material. However, all or part of such surfaces may also comprise separate members secured to the camera body and the rear cover. Reference numerals 5 and 6 designate an upper decoration plate and a lower decoration plate, respectively, and reference numeral 9 designates a reinforcing member described below.

FIG. 3 is a plan view showing the spatula key side of the hinged rear cover. Reference numeral 7 designates a spatula key secured to the rear cover by rivets (not shown). The phantom line 8 is parallel to the optical axis. The angle between a part 3a-1 or 3c-1 of the upper section 3a or lower section 3c of the rear cover and the line 8 is designated $\theta$. The rear cover is swung around the hinge when opened or closed, while the spatula key side of the rear cover slides in a groove in the camera body. To overcome the frictional resistance due to such sliding contact, and thereby facilitate the rear cover opening and improve the moisture and dust sealing effect, the angle $\theta$ is increased well beyond 90°. That is, with a small angle $\theta$ the gasket on the spatula key side tends to be forced into the latching groove of the camera body during cover closure, which may damage or deform the gasket and weaken or disrupt the seal. Increasing the angle $\theta$, however, serves to lessen such gasket forcing and distortion, and reduces the frictional resistance encountered when the gasket is jammed in the latching groove.

Figure 4:
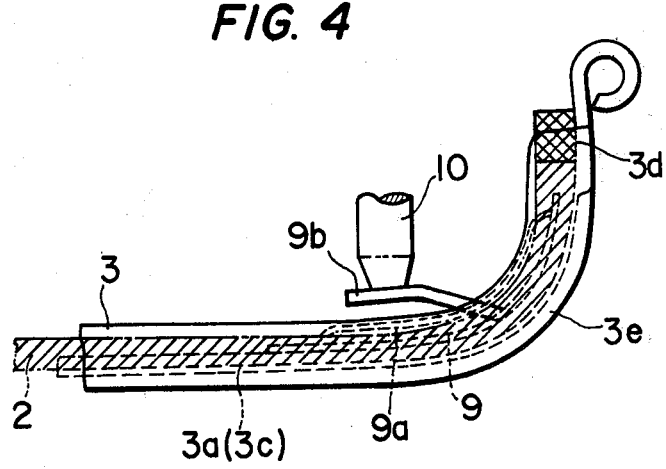
FIG. 4 shows a plan view of the hinge side of the rear cover.
Figure 5:
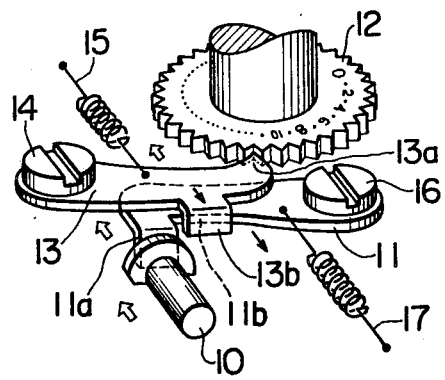
FIG. 5 shows a perspective view of part of the film counter mechanism.

FIG. 4 is a plan view showing the hinge side of the rear cover. To strengthen the rear cover a reinforcing member 9 having rib sections 9a made of elastic material is fixedly secured to the rear cover by rivets (not shown). An elastic tab 9b of the reinforcing member 9 is designed to cooperate with an interlocking pin 10 associated with a film counter automatic restoring mechanism in the camera body 1 when the rear cover is opened or closed. The pin 10 is axially slidable in the camera body, and is biased in the direction of the arrow in FIG. 2 by a release spring 17 coupled to a pivotal lever 11, as shown in FIG. 5. The film pressure plate and its related components are not shown in FIG. 2 for simplification.

FIG. 5 shows the film counter mechanism. Numerals indicating the number of exposed frames are stamped on a disk 12 having teeth cut in its periphery corresponding to the numerals. The disk 12 is turned one tooth in response to each winding or film advance operation of the camera by a mechanism (not shown), and a resetting force is applied to the disk at all times by a spring (not shown). A ratchet pawl 13 turns around a shaft 14 secured to the camera body with a screw. The pawl 13a of the ratchet pawl 13 engages a tooth of the disk 12, while a lip 13b engages the lever 11. A spring 15 secured to the camera body biases the ratchet pawl 13 in the direction of the arrow ( → ). The lever 11 pivots around a shaft 16 secured to the camera body with a screw, whereby a lip 11a of the lever 11 engages the interlocking pin 10, while an edge 11b engages the ratchet pawl lip 13b. The elastic force of the release spring 17 is much greater than that of the spring 15.

When the rear cover 3 is closed the force of the elastic tab 9b of the reinforcing member 9 is much greater than the force exerted on the lever 11 by the release spring 17 and therefore the lever 11 is moved in the direction of the arrow ( ← ) through the interlocking pin 10 to disengage the ratchet pawl 13. As a result, only the spring 15 acts on the ratchet pawl to cause the latter to engage a tooth of the disk 12. Accordingly, when the disk 12 is turned one tooth in response to a film winding operation of the camera, it is locked by the ratchet pawl 13.

On the other hand, when the rear cover is opened the force applied to the interlocking pin 10 by the tab 9b is released. The lever 11 and the ratchet pawl 13 are therefore moved in the direction of the arrow (→) by the release spring 17, as a result of which the ratchet pawl is disengaged from the disk 12 to thereby reset the disk.

Figure 6:
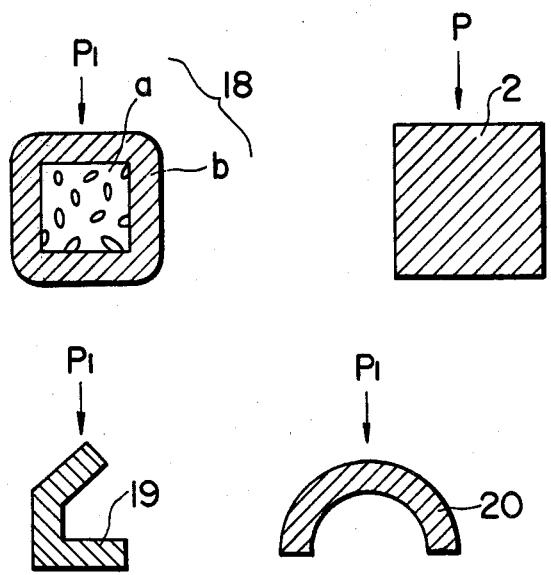
FIG. 6 shows sectional views of various viscoelastic members.

FIG. 6 shows sectional views of various viscoelastic sealing gaskets 2 made of rubber or plastic material. Reference numeral 18 designates a gasket obtained by covering a foamed core a with a rubber material b. Reference numerals 19 and 20 designate bendable gaskets. That is, gasket 19 is U-shaped or L-shaped, while gasket 20 is semicircular. When it is intended to provide the same amount of deformation with the four different gaskets shown in FIG. 6, the pressure $P_1$ applied to gasket 18, 19 or 20 is much less than the pressure P applied to the conventional square gasket 2. That is, when compared to a square sealing gasket 2 in which the viscoelastic force is directly utilized, the "softer" gaskets 18, 19 or 20 require less compressive force and can thus provide improved moisture and dust proofing effects. In all cases the exterior of the gasket presents a closed cell surface which provides a positive barrier against the entry of moisture and dust, unlike the open celled sponge materials of the prior art gaskets.

The second embodiment shown in FIGS. 7 and 8 differs from the first embodiment only in that the sealing gasket 2 is bonded to the camera body 1 rather than to the rear cover 3. The construction is the same in all other respects, and accordingly the same reference numerals have been used in FIGS. 7 and 8 as were used in FIGS. 1-6 to describe the first embodiment.

What is claimed is:

1. In a camera including a camera body defining a film compartment on the rear side thereof, and a rear cover hinged on one end to one end of the camera body and having latching means on its other end cooperable with closure means on the other end of the camera body, improved means for sealing the film compartment against the incursion of dust and moisture when the rear cover is closed, characterized by:
   (a) continuous mating grooves and edge flanges on the camera body and on the inside of the rear cover, respectively, or vice versa, surrounding the perimeter of the film compartment,
   (b) a continuous, deformable, closed-loop sealing gasket disposed in said grooves and formed of a foamed, viscoelastic, independent closed cell material, said gasket being compressively sandwiched between the camera body and closed rear cover to thereby seal the film compartment against dust and moisture,
   (c) a spring biased interlocking pin for an automatic film counter restoring mechanism slidably mounted in the camera body inside of the film compartment perimeter and extending outwardly from the camera body, and
   (d) means on the inside of the rear cover for operatively engaging and depressing said pin when the cover is closed.

2. A camera as defined in claim 1, wherein said pin engaging means comprises a flexible tab extending outwardly from a reinforcing plate secured to said rear cover.

3. A camera as defined in claims 1 or 2, wherein said sealing gasket has a U or L shaped cross-section, and is mounted such that the rear cover closure pressure acts to bend the legs of the gasket closer toward each other.

4. A camera as defined in claims 1 or 2, wherein said sealing gasket has a semicircular cross-section.

5. In a camera including a camera body defining a film compartment on the rear side thereof, and a rear cover hinged on one end to one end of the camera body and having latching means on its other end cooperable with closure means on the other end of the camera body, improved means for sealing the film compartment against the incursion of dust and moisture when the rear cover is closed, characterized by:
   (a) continuous mating grooves and edge flanges on the camera body and on the inside of the rear cover, respectively, or vice versa, surrounding the perimeter of the film compartment, and
   (b) a continuous, deformable, closed loop sealing gasket disposed in said grooves and formed of a foamed, viscoelastic, independent closed cell material, said gasket being compressively sandwiched between the camera body and closed rear cover to thereby seal the film compartment against dust and moisture, and comprising a foamed core of rubber, urethane, or the like completely covered with a surrounding outer layer of a non-porous viscoelastic material, such as rubber.

* * * * *